(No Model.)
W. MENZIES.
PNEUMATIC TIRE.
No. 589,185. Patented Aug. 31, 1897.
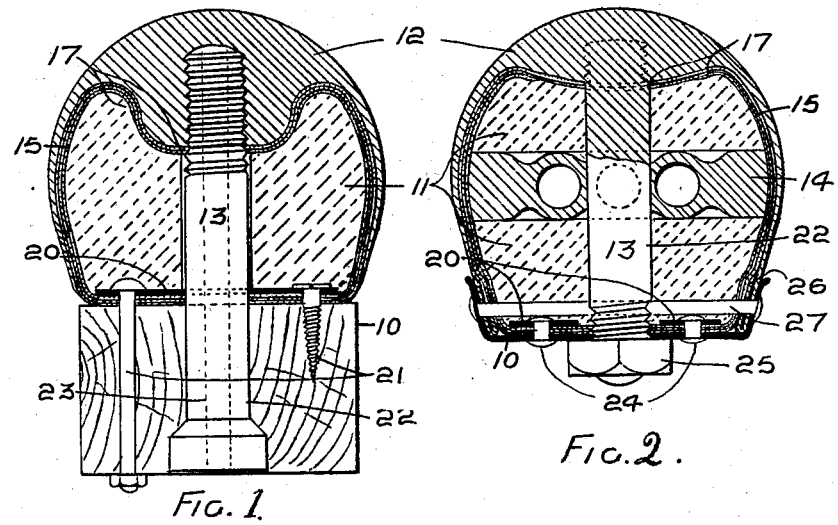
Witnesses
H. van Oldenneel
E. A. Scott
Inventor
William Menzies
by Richardson
Attys

UNITED STATES PATENT OFFICE.

WILLIAM MENZIES, OF BROUGHTY FERRY, SCOTLAND.

PNEUMATIC TIRE.

SPECIFICATION forming part of Letters Patent No. 589,185, dated August 31, 1897.

Application filed October 30, 1896. Serial No. 610,575. (No model.)

*To all whom it may concern:*

Be it known that I, WILLIAM MENZIES, a subject of the Queen of Great Britain and Ireland, and a resident of Danellen Villa, West Ferry, Broughty Ferry, in the county of Forfar, Scotland, have invented a certain new and useful Improvement in and Relating to Elastic or Pneumatic Tires of Vehicles, of which the following is a specification.

The object of my invention is to provide a tire which shall be resilient, durable, safe, light, and inexpensive.

Referring to the drawings which form a part of this specification, Figure 1 is a cross-section of a tire suitable for heavy vehicles, and Fig. 2 is a cross-section of another modification of a tire used for a similar purpose.

In carrying out my invention I attach to the rim 10 of the wheel in any suitable known way a piece or pieces of solid cork 11 in such a manner that they form a ring. The tread of such cork ring is protected by a circumferential ring 12, of india-rubber and canvas 15 or with any other suitable elastic material. The cross-section of the cork rim may be of any suitable section, the rubber tread being molded to suit. I bore a series of holes 13 into or through the cork, the axes of such holes preferably radiating from the center of the wheel and fill or even rather more than fill such holes with rubber, the tread being fixed to such rubber as well as the cork.

Sometimes I make the rubber tread hollow, and I may inflate it with air in the known way and fix it to the cork or the rim.

I may also make the tire compound—that is to say, it may be formed of concentric rings of cork 11 and rubber 14, fastened together and to the rim.

In the form illustrated by Fig. 1, say, three ply of canvas 15 is fixed to the rim 10 by means of cement or solution and a metal or wooden band 20, which is attached to the rim by the screws or bolts 21. The cork core 11 is shaped to the section shown, it being then attached in position by means of the canvas 15 as previously explained. In order that there may be no unsightly ridge where the canvas overlaps, the two inner plies are shorter—that is to say, at 17 only one piece of canvas overlaps. The cover is fixed to the canvas in the usual way, and it is further secured by rubber bolts 22. These bolts are hollow, having a core 23 of rectangular section through them. In screwing such bolts into position a metal key of the same section as the core 23 is pushed into such hole, and by turning it the bolt is kept so rigid that it can be readily turned also.

If desired, the screwed portion of the bolt may be dipped into solution before screwing it into place, and thus it may be more securely fixed.

In the modification illustrated by Fig. 2 the canvas 15 is fixed to the rim by a metal or wooden band or bands 20, such bands being riveted to the rim 10 by means of rivets 24. The compound core 11 14 is then fixed in position as previously explained. The cover 12 in this modification has the bolts 22 screwed into it or molded along with it, and such cover may be in sections. The bolts are then secured by the nuts 25. Such cover is additionally secured by means of metal segments 26, which are contained in channels of canvas incorporated with the cover and secured to the rim by rivets or bolts 27. The sides of the said rim 10 may be of any suitable depth for the double purpose of protecting the sides of the tire and minimizing lateral roll.

Having now described my invention, what I claim as new, and desire to secure by Letters Patent, is—

1. A tire for vehicles comprising the cork center, the canvas covering, the outer tread, and the rubber bolts or filling-pieces arranged in openings in the cork center and extending radially from the wheel-rim to the outer tread portion, substantially as described.

2. A tire for vehicle-wheels comprising the cork center, the canvas covering, the outer tread and the rubber filling-pieces passing through openings in the cork center and canvas cover and having their outer ends threaded into said tread, substantially as described.

3. A tire for vehicle-wheels comprising the cork center, the canvas covering, the outer tread, and the rubber filling-pieces or bolts passing through openings in the cork center and canvas cover and having their inner ends connected with the rim and their outer ends connected with the tread, substantially as described.

4. A tire for vehicle-wheels comprising the cork center, the canvas covering, the plates for securing the cover to the rim, the outer tread, and the rubber bolts having their outer ends connected with the tread and their inner ends connected with the rim, substantially as described.

In witness whereof I have hereunto set my hand in presence of two witnesses.

WILLIAM MENZIES.

Witnesses:
BELLA KIDNEY,
P. B. STEIH.